US012595363B2

(12) United States Patent
Imamura et al.

(10) Patent No.: US 12,595,363 B2
(45) Date of Patent: Apr. 7, 2026

(54) THERMOPLASTIC RESIN COMPOSITION AND METHOD FOR PRODUCING SAME

(71) Applicant: KANEKA CORPORATION, Osaka (JP)

(72) Inventors: Yuichi Imamura, Osaka (JP); Masayoshi Kido, Osaka (JP); Takahiro Akinaga, Osaka (JP)

(73) Assignee: KANEKA CORPORATION, Osaka (JP)

( * ) Notice: Subject to any disclaimer, the term of this patent is extended or adjusted under 35 U.S.C. 154(b) by 885 days.

(21) Appl. No.: 17/873,588

(22) Filed: Jul. 26, 2022

(65) Prior Publication Data

US 2022/0363892 A1      Nov. 17, 2022

Related U.S. Application Data

(63) Continuation of application No. PCT/JP2021/007924, filed on Mar. 2, 2021.

(30) Foreign Application Priority Data

Mar. 31, 2020      (JP) ................................. 2020-064209

(51) Int. Cl.
*C08L 67/03*          (2006.01)
*C08F 255/08*          (2006.01)

(52) U.S. Cl.
CPC ............ *C08L 67/03* (2013.01); *C08F 255/08* (2013.01); *C08L 2205/06* (2013.01); *C08L 2205/12* (2013.01)

(58) Field of Classification Search
CPC .. C08F 212/08; C08F 220/325; C08F 255/08; C08L 101/12; C08L 2205/06; C08L 2205/12; C08L 23/26; C08L 51/06; C08L 67/00; C08L 67/03
See application file for complete search history.

(56) References Cited

U.S. PATENT DOCUMENTS 5,314,946 A * 5/1994 Tajima ................... C08L 23/10
525/903

FOREIGN PATENT DOCUMENTS

| | | |
|---|---|---|
| JP | H04198353 A | 7/1992 |
| JP | H07157667 A | 6/1995 |
| JP | H07508050 A | 9/1995 |
| JP | H08012862 A | 1/1996 |
| JP | H10330602 A | 12/1998 |
| JP | 2001064449 A | 3/2001 |
| JP | 2002241550 A | 8/2002 |
| JP | 2018203810 A | 12/2018 |
| JP | 2019099618 A | 6/2019 |
| WO | 9324574 A1 | 12/1993 |

OTHER PUBLICATIONS

International Search Report issued in corresponding International Application No. PCT/JP2021/007924, mailed May 11, 2021, with translation (5 pages).
Written Opinion issued in corresponding International Application No. PCT/JP2021/007924, mailed May 11, 2021 (3 pages).

* cited by examiner

*Primary Examiner* — Ana L. Woodward
(74) *Attorney, Agent, or Firm* — Osha Bergman Watanabe & Burton LLP

(57) ABSTRACT

A thermoplastic resin composition having good formability and low dielectric characteristics that have not been achieved by conventional liquid crystal polymer resin compositions, while maintaining excellent heat resistance and flame retardancy of liquid crystal polymers, and usable for information and communication devices used in a high frequency range is provided. A thermoplastic resin composition contains liquid crystal polymers (A) and a modified polyolefin (B) having a polar group. The liquid crystal polymer (A) contains a first liquid crystal polymer (a-1) that has a melting point of less than 300° C. and a second liquid crystal polymer (a-2) that has a melting point of 300° C. or more. It is preferable for the thermoplastic resin composition that the phase structure is a sea-island structure or a bicontinuous structure, and the second liquid crystal polymer (a-2) is contained at least in a sea phase or a continuous phase.

20 Claims, 1 Drawing Sheet

THERMOPLASTIC RESIN COMPOSITION AND METHOD FOR PRODUCING SAME

TECHNICAL FIELD

One or more embodiments of the present invention relate to a thermoplastic resin composition and a method of producing the thermoplastic resin composition.

BACKGROUND

In recent years, communication devices, such as smartphones, and electronic devices, such as next-generation televisions, have been required to achieve high-speed transmission and reception of large-volume data. Associated with this trend, electrical signal has been advanced to have higher frequency. Specifically, in the field of wireless communication, the fifth generation mobile communication system (5G) is expected to be launched around 2020. To launch the 5G, operation at a frequency band as high as 10 GHz or more has been investigated.

Unfortunately, as the frequency of signals for operation increases, output signal quality decreases, namely, transmission loss increases, which could lead to false recognition of information. The transmission loss is composed of conductor loss, caused by a conductor, and dielectric loss, caused by insulating resin in electrical or electronic components, such as electronic or communication device boards, in which the conductor and dielectric losses are respectively proportional to the $0.5\text{-}^{th}$ power and the first power of the operation frequency. Therefore, the dielectric loss has a very high impact at a high-frequency band, particularly, at a GHz band.

In order to reduce the transmission loss, therefore, a need exists for low dielectric materials having a low level of relative permittivity and dielectric dissipation factor, which are dielectric loss related factors. Circuit board materials should also contribute to an increase in signal transmission speed and to a reduction in transmission loss. For that purpose, new materials have been searched that can be superior in low dielectric properties to existing polyimide and epoxy resins. The important required properties also include heat resistance, such as reflow soldering resistance, flame retardancy, molding processability, and dimensional stability. Under such circumstances, for example, studies have been conducted on liquid crystal polymers for use as low dielectric materials in a high frequency range.

For a further reduction in transmission loss, however, such liquid crystal polymers and other low dielectric resins need to have improved low dielectric properties. Liquid crystal polymers also have difficulty in melt-processing due to their anisotropy. For example, if a liquid crystal polymer is subjected to an extrusion process, which is a typical method for forming a film, the melt of the liquid crystal polymer discharged from the die will immediately drip off due to a reduction in melt viscosity caused by the shear force in the discharging direction, which will make it difficult to draw a film. Even if it is possible to draw a film, the resulting film can tear very easily due to the orientation of the liquid crystal polymer in the film. The liquid crystal polymer has difficulty in cutting a strand to produce pellets due to its anisotropy. Specifically, for example, the liquid crystal polymer strand cannot be cut into pellets, or even if its strand can be cut into pellets, the resulting cut surface will be not clean or the resulting pellets will tend to have whiskers. Unevenness in the pellet shape or whiskers on the pellets can cause instability in measuring the amount of the liquid crystal polymer in the process of molding the liquid crystal polymer. Although having high strength, the liquid crystal polymer can also be brittle and breakable depending on test conditions.

Under such circumstances, studies have been conducted on blending a liquid crystal polymer with polyolefin to form a composition with improved molding processability and improved anisotropy. For example, Patent Document 1 discloses a polymer blend including a polyolefin, a liquid crystal polymer, and a compatibilizing agent such as a grafted polyolefin and having a high level of tensile strength and impact strength. Patent Document 2 discloses a liquid crystal polymer resin composition including a liquid crystal polymer, an epoxy group-containing ethylene copolymer, and a plate-like filler and having improved flexibility. Patent Document 3 discloses an aromatic polyester composition including an olefin copolymer and a liquid crystal polymer including a hydroxybenzoic acid-derived unit, a biphenol-derived unit, an ethylene glycol-derived unit, and a phthalic acid-derived unit.

PATENT LITERATURE

Patent Document 1: Japanese Unexamined Patent Application (Translation of PCT Application), Publication No. H7-508050

Patent Document 2: Japanese Unexamined Patent Application, Publication No. 2018-203810

Patent Document 3: Japanese Unexamined Patent Application, Publication No. H8-012862

Unfortunately, a blend of a liquid crystal polymer and a polyolefin will no longer maintain the original heat resistance of the liquid crystal polymer. In general, a liquid crystal polymer is less compatible with a polyolefin, and it is difficult to find a simple way to blend them. Thus, before blending, the polyolefin is modified by grafting or copolymerizing with a polar monomer. Unfortunately, the modified polyolefin generally has a lower thermal decomposition temperature than that of the unmodified polyolefin and may undergo decomposition when melted and blended with a high-melting-point liquid crystal polymer, and may cause, for example foaming, during molding. Under such circumstances, a low-melting-point grade liquid crystal polymer is inevitably used to form a blend with a polyolefin, and the resulting thermoplastic resin composition remains unsatisfactory in terms of heat resistance. Patent Documents 1 and 2 disclose examples using the liquid crystal polymers having a melting point of at most about 280° C. While not showing any melting point, Patent Document 3 discloses an example in which mixing and molding are performed at a temperature of 300° C., which suggests that no high-melting-point liquid crystal polymers are usable.

Liquid crystal polymers are required to have still lower dielectric properties, and liquid crystal polymers are expected to have improved dielectric properties by blending a polyolefin resin, which is superior in low dielectric properties. Unfortunately, due to the compatibility problem described above, the blending is difficult using a liquid crystal polymer with a melting point of at least 300° C., and it has been unsuccessful in obtaining a resin composition that maintain the high heat resistance of a liquid crystal polymer and also has low dielectric properties.

One or more embodiments of the present invention have been made in light of the above. One or more embodiments of the present invention provide a thermoplastic resin composition having improved compatibility and high molding processability, having high heat resistance and high flame retardancy comparable to those of liquid crystal polymers, and having low dielectric properties at a level that has not been possible with conventional liquid crystal polymer resin compositions, and being also suitable for use in information communication devices to be operated in high-frequency range.

As a result of intensive studies, the inventors have completed one or more embodiments of the present invention based on findings that a combination of two liquid crystal polymers having different melting points can have improved compatibility with a modified polyolefin and can form a composition with reduced permittivity and reduced dielectric dissipation factor with the heat resistance of the liquid crystal polymers remaining unreduced.

SUMMARY

Specifically, one or more embodiments of the present invention provide the following aspects (1) to (8).

(1) A thermoplastic resin composition including: liquid crystal polymers (A); and a modified polyolefin (B) having a polar group, the liquid crystal polymers (A) including: a first liquid crystal polymer (a-1) having a melting point of less than 300° C.; and a second liquid crystal polymer (a-2) having a melting point of 300° C. or more.

(2) The thermoplastic resin composition according to aspect (1), having a phase structure of a sea-island structure or a co-continuous structure, wherein the sea-island structure contains a sea phase forming a continuous region and island phases forming discontinuous regions dispersed in the sea phase, the co-continuous structure contains two or more components forming two or more continuous phases, the two or more continuous phases being mixed with each other, and the second liquid crystal polymer (a-2) is contained at least in the sea phase or the continuous phase.

(3) The thermoplastic resin composition according to aspect (1) or (2), wherein the polar group is an epoxy group.

(4) The thermoplastic resin composition according to any one of aspects (1) to (3), wherein the modified polyolefin (B) has a melting point of 200° C. or more.

(5) The thermoplastic resin composition according to any one of aspects (1) to (4), wherein the modified polyolefin (B) is a modified polymethylpentene.

(6) The thermoplastic resin composition according to any one of aspects (1) to (5), wherein the modified polyolefin (B) is a graft-modified polyolefin.

(7) The thermoplastic resin composition according to any one of aspects (1) to (6), wherein a mass ratio (A)/(B) of the liquid crystal polymers (A) and the modified polyolefin (B) is 95/5 to 55/45.

(8) A method of producing the thermoplastic resin composition according to any one of aspects (1) to (7), the method including: melting and kneading the first liquid crystal polymer (a-1), the second liquid crystal polymer (a-2), and the modified polyolefin (B) having a polar group.

One or more embodiments of the present invention make it possible to provide a thermoplastic resin composition having improved compatibility and high molding processability, having high heat resistance and high flame retardancy comparable to those of liquid crystal polymers, and having low dielectric properties at a level that has not been possible with conventional liquid crystal polymer resin compositions. The thermoplastic resin composition according to one or more embodiments of the present invention has low dielectric properties and heat resistance, such as resistance to reflow soldering, and is suitable for use in information communication devices to be operated in high-frequency range.

DETAILED DESCRIPTION

Thermoplastic Resin Composition

Figure 1:
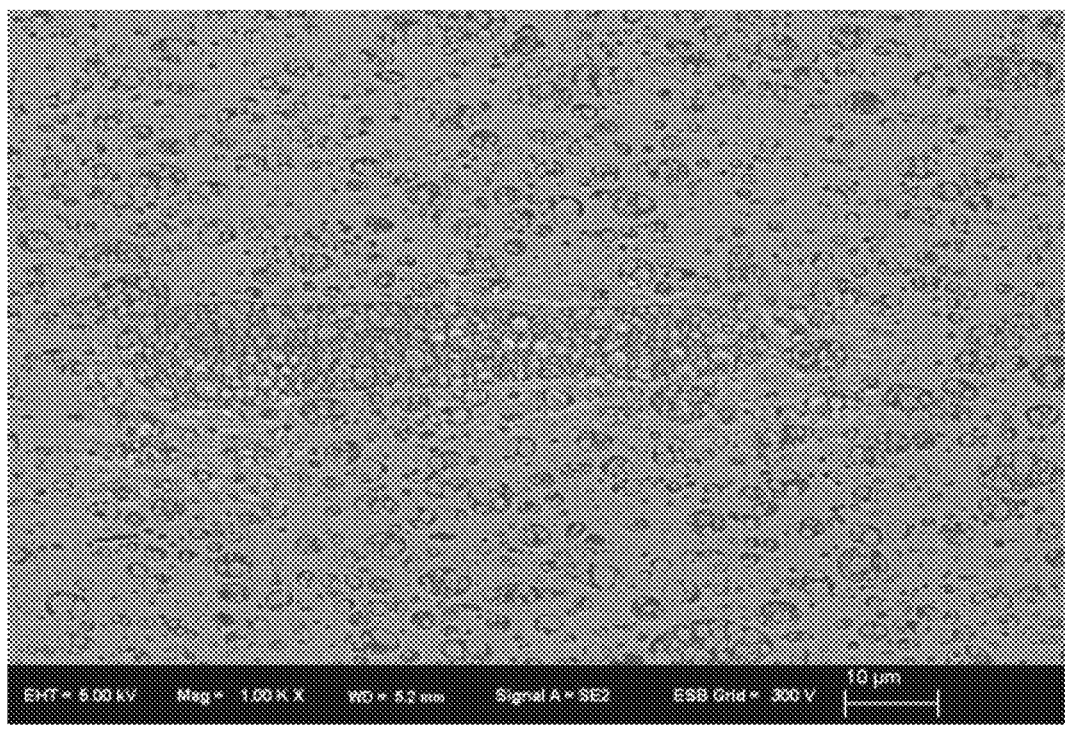
FIG. 1 is a scanning electron micrograph (at a magnification of 1,000 times) of a surface of an extruded product obtained from a thermoplastic resin composition according to one or more embodiments of the present invention in Example 11.

The thermoplastic resin composition includes: liquid crystal polymers (A); and a modified polyolefin (B) having a polar group, in which the liquid crystal polymers (A) include: a first liquid crystal polymer (a-1) having a melting point of less than 300° C.; and a second liquid crystal polymer (a-2) having a melting point of 300° C. or more. In the present disclosure, the modified polyolefin (B) having a polar group will also be referred to as the "modified polyolefin (B)".

Thanks to its low dielectric properties and high heat resistance, the thermoplastic resin composition is suitable for use in electrical and electronic components, information communication devices, components for the information communication devices, and other components to be operated in high-frequency range. The term "low dielectric properties" may mean that the thermoplastic resin composition has a relative permittivity lower than that of a liquid crystal polymer, specifically, a relative permittivity of 2.9 or less, preferably 2.8 or less, at a frequency of 10 GHz, or has a dielectric dissipation factor of 0.0025 or less at 10 GHz.

The thermoplastic resin composition can form different phase states depending on the melting point of each of the first liquid crystal polymer (a-1), the second liquid crystal polymer (a-2), and the modified polyolefin (B), the difference between the melting points, the mix proportions of the components, the temperature during the mixing, the type of the polar group of the modified polyolefin (B), the modification degree of the modified polyolefin (B), and various other conditions. In general, the liquid crystal polymer (a-2) itself, with a melting point of 300° C. or more, will be insufficiently compatible with another resin and may also be incompatible with the liquid crystal polymer (a-1) with a melting point of less than 300° C. In the thermoplastic resin composition, however, the three components, including the modified polyolefin (B), are in such a state that they are highly compatibilized with one another, which will provide good moldability and good physical properties.

The thermoplastic resin composition can have such advantageous effects due to the reaction of the first liquid crystal polymer (a-1) with the modified polyolefin (B) during the initial stage of the mixing. In the thermoplastic resin composition, such a reaction can protect the polar group of the modified polyolefin (B), which would otherwise generally have low heat resistance, to make the modified polyolefin (B) resistant to decomposition even during the mixing at high temperature, thereby making it possible to mix the modified polyolefin (B) with the second liquid crystal polymer (a-2). Such a reaction can also allow the first liquid crystal polymer (a-1) with a melting point of less than 300° C. to be partially bonded to the modified polyolefin (B) and thus to form a polymer, which can function as a compatibilizing agent for the second liquid crystal polymer (a-2). The reaction described above would lead to an improvement in compatibility and allow the resulting thermoplastic resin composition to maintain the advantages of all components.

The thermoplastic resin composition may have a sea-island structure or a co-continuous structure as a phase structure. At least the sea phase or the continuous phase may include the second liquid crystal polymer (a-2). That is, the second liquid crystal polymer (a-2) is contained in at least one phase of the sea phase and the two or more continuous phases. As used herein, the term "sea-island structure" refers to a structure including; a sea phase, which forms a continuous region; and an island phase, which forms discontinuous regions, in which the island phase is dispersed in the sea phase. The term "co-continuous structure" refers to a structure including two or more components each forming a continuous phase and being mixed with one another.

When in such a phase state, the thermoplastic resin composition will have high melt processability because of a reduction in the anisotropy derived from the properties of the liquid crystal polymers (A). When the liquid crystal polymer (A), specifically the second liquid crystal polymer (a-2), forms a sea component or forms a continuous phase in a co-continuous structure, the thermoplastic resin composition tends to have high heat resistance, which is derived from the liquid crystal polymer (A).

The thermoplastic resin composition is produced by mixing the first liquid crystal polymer (a-1), the second liquid crystal polymer (a-2), and the modified polyolefin (B). They may be mixed by any mixing method. For example, they may be mixed by a melt-kneading method using an extruder such as a single or twin screw extruder. In a preferred method, the three components are simultaneously melted and kneaded. Alternatively, the first liquid crystal polymer (a-1) and the modified polyolefin (B) may be first melted and kneaded, which may be followed by mixing the second liquid crystal polymer (a-2).

The first liquid crystal polymer (a-1), the second liquid crystal polymer (a-2), and the modified polyolefin (B) may be mixed under any conditions that allow the components to be mixed uniformly and do not cause excessive thermal decomposition or sublimation of each component. When a melt kneading machine is used, the melting and kneading may be performed at a temperature several tens of degrees centigrade (° C.) higher than the melting point of the second liquid crystal polymer (a-2), for example, at a temperature 5° C. or more and 100° C. or less higher than the melting point, or at a temperature 10° C. or more and 50° C. or less higher than the melting point.

In the thermoplastic resin composition, the liquid crystal polymers (A) and the modified polyolefin (B) may be in any mass ratio (A)/(B). The mass ratio (A)/(B) may be 95/5 to 55/45, 92/7 to 70/30, or 90/10 to 77/23. With their mass ratio in such a range, the thermoplastic resin composition tends to have both high heat resistance and low dielectric properties. The first liquid crystal polymer (a-1) and the second liquid crystal polymer (a-2) may also be in any mass ratio (a-1)/(a-2). While the second liquid crystal polymer (a-2) may be a main component, they may be in any appropriate mass ratio depending on the desired physical properties, the type of combination of monomer units constituting them, or other conditions. For example, the thermoplastic resin composition tends to have particularly high heat resistance when the first liquid crystal polymer (a-1) and the second liquid crystal polymer (a-2) are in a mass ratio (a-1)/(a-2) in the range of 3/2 to 1/10, especially, in the range of 1/1 to 1/5, which will be described in detail later.

As long as one or more embodiments of the present invention are not interfered with, the thermoplastic resin composition may contain an additional resin other than the liquid crystal polymers (A) and the modified polyolefin (B). Typically, the content of the liquid crystal polymers (A) and the modified polyolefin (B) in the thermoplastic resin composition may be 80% by mass or more, 90% by mass or more, 95% by mass or more, or 100% by mass, based on the total mass of the resin components of the thermoplastic resin composition.

Examples of the additional resin include non-graft-modified polyolefins, non-liquid crystalline polyesters, such as polyethylene terephthalate and polybutylene terephthalate, polyamides, polyester amides, polyimides, polyamide imides, polycarbonates, polyacetals, polyphenylene sulfides, polyphenylene ethers, polysulfones, polyethersulfones, polyetherimides, silicone resins, and fluororesins.

If necessary, the thermoplastic resin composition may contain an inorganic filler. Examples of the inorganic filler include calcium carbonate, talc, clay, silica, magnesium carbonate, barium sulfate, titanium oxide, alumina, montmorillonite, gypsum, glass flakes, glass fibers, milled glass fibers, carbon fibers, alumina fibers, silica alumina fibers, aluminum borate whiskers, and potassium titanate fibers. One of the inorganic fillers may be used alone, or two or more of the inorganic fillers may be used in combination.

Depending on the intended use of the thermoplastic resin composition, the content of the inorganic filler may be determined within the range where the thermoplastic resin composition is prevented from damaging its low dielectric properties. For example, when the thermoplastic resin composition is used to form a film, the upper limit of the inorganic filler content may be determined within the range where the inorganic filler does not significantly reduce the mechanical strength of the film.

If necessary, the thermoplastic resin composition may further contain various additives, such as an organic filler, an antioxidant, a thermal stabilizer, a light stabilizer, a flame retardant, a lubricant, an antistatic agent, a coloring agent, an anticorrosive agent, a cross-linking agent, a foaming agent, a fluorescent agent, a surface smoothing agent, a surface gloss modifier, and a mold release improving agent.

These additives may be used alone, or two or more of these additives may be used in combination.

Hereinafter, the liquid crystal polymers (A) and the modified polyolefin (B) will be described.

Liquid Crystal Polymers (A)

The liquid crystal polymers (A) may be polymers that exhibit optical anisotropy when melted, and any polymers may be used which are recognized as thermotropic liquid crystal polymers by those skilled in the art as long as they have specific melting points as described later. The optical anisotropy of the melt can be checked by a conventional polarization test method using orthogonal polarizers.

The liquid crystal polymers (A) are each typically produced by polycondensation of a monomer mixture including an acylation product of a monomer having a phenolic hydroxyl group. The polycondensation may be carried out in the presence of a catalyst. As described later, it is possible to control the composition of this monomer mixture so as to prepare each of the first liquid crystal polymer (a-1) and the second liquid crystal polymer (a-2), which are components for the thermoplastic resin composition.

Examples of the catalyst include metal compounds, such as magnesium acetate, stannous acetate, tetrabutyl titanate, lead acetate, sodium acetate, potassium acetate, and antimony trioxide; and nitrogen-containing heterocyclic compounds, such as 1-methylimidazole. The catalyst may be used in an amount of, for example, 0.1 parts by mass or less based on 100 parts by mass of the monomer mixture.

As mentioned above, the monomer mixture is a mixture of monomers including an acylation product of a monomer having a phenolic hydroxyl group. The monomer mixture may contain a monomer having no phenolic hydroxyl group, such as an aromatic dicarboxylic acid represented by terephthalic acid or isophthalic acid.

In view of cost and production time, the method of preparing the monomer mixture may include acylating a monomer mixture including a monomer having a phenolic hydroxyl group to form a monomer mixture containing an acylation product of the monomer having a phenolic hydroxyl group.

Examples of the constitutional unit of the liquid crystal polymer include an aromatic oxycarbonyl unit, an aromatic dicarbonyl unit, an aromatic dioxy unit, an aromatic aminooxy unit, an aromatic diamino unit, an aromatic aminocarbonyl unit, and an aliphatic dioxy unit. The liquid crystal polymer may also contain an additional bond other than the ester bond, such as an amide bond or a thioester bond.

The aromatic oxycarbonyl unit is a unit derived from an aromatic hydroxycarboxylic acid.

Preferred examples of the aromatic hydroxycarboxylic acid include p-hydroxybenzoic acid, m-hydroxybenzoic acid, o-hydroxybenzoic acid, 6-hydroxy-2-naphthoic acid, 5-hydroxy-2-naphthoic acid, 3-hydroxy-2-naphthoic acid, 4'-hydroxyphenyl-4-benzoic acid, 3'-hydroxyphenyl-4-benzoic acid, 4'-hydroxyphenyl-3-benzoic acid, and alkyl-, alkoxy-, or halogen-substituted derivatives thereof.

Ester-forming derivatives, such as ester derivatives or acid halides of the aromatic hydroxycarboxylic acid, also may be used, like the aromatic hydroxycarboxylic acid.

Among these aromatic hydroxycarboxylic acids, p-hydroxybenzoic acid and 6-hydroxy-2-naphthoic acid are preferred because the liquid crystal polymer obtained therefrom becomes easier to adjust the mechanical properties or melting point.

The aromatic dicarbonyl repeating unit is a unit derived from an aromatic dicarboxylic acid.

Preferred examples of the aromatic dicarboxylic acid include terephthalic acid, isophthalic acid, 2,6-naphthalenedicarboxylic acid, 1,6-naphthalenedicarboxylic acid, 2,7-naphthalenedicarboxylic acid, 1,4-naphthalenedicarboxylic acid, 4,4'-dicarboxybiphenyl, and other aromatic dicarboxylic acids, and alkyl-, alkoxy-, or halogen-substituted derivatives thereof.

Ester-forming derivatives, such as ester derivatives or acid halides of the aromatic dicarboxylic acid, also may be used, like the aromatic dicarboxylic acid.

Among these aromatic dicarboxylic acids, terephthalic acid and 2,6-naphthalenedicarboxylic acid are preferred because the liquid crystal polymer obtained therefrom becomes easier to adjust the mechanical properties, heat resistance, melting point, or formability to a suitable level.

The aromatic dioxy repeating unit is a unit derived from an aromatic diol.

Preferred examples of the aromatic diol include hydroquinone, resorcin, 2,6-dihydroxynaphthalene, 2,7-dihydroxynaphthalene, 1,6-dihydroxynaphthalene, 1,4-dihydroxynaphthalene, 4,4'-dihydroxybiphenyl, 3,3'-dihydroxybiphenyl, 3,4'-dihydroxybiphenyl, 4,4'-dihydroxybiphenyl ether, and alkyl-, alkoxy- or halogen-substituted derivatives thereof.

Among these aromatic diols, hydroquinone, resorcin, and 4,4'-dihydroxybiphenyl are preferred in terms of reactivity for polycondensation and the properties of the resulting liquid crystal polymer.

The aromatic aminooxy unit is a unit derived from an aromatic hydroxyamine.

Preferred examples of the aromatic hydroxyamine include p-aminophenol, m-aminophenol, 4-amino-1-naphthol, 5-amino-1-naphthol, 8-amino-2-naphthol, 4-amino-4'-hydroxybiphenyl, and other aromatic hydroxyamines, and alkyl-, alkoxy-, or halogen-substituted derivatives thereof.

The aromatic diamino unit is a unit derived from an aromatic diamine.

Preferred examples of the aromatic diamine include p-phenylenediamine, m-phenylenediamine, 1,5-diaminonaphthalene, 1,8-diaminonaphthalene, and other aromatic diamines, and alkyl-, alkoxy-, or halogen-substituted derivatives thereof.

The aromatic aminocarbonyl unit is a unit derived from an aromatic aminocarboxylic acid.

Preferred examples of the aromatic aminocarboxylic acid include p-aminobenzoic acid, m-aminobenzoic acid, 6-amino-2-naphthoic acid, and other aromatic aminocarboxylic acids, and alkyl-, alkoxy-, or halogen-substituted derivatives thereof.

Ester-forming derivatives, such as ester derivatives or acid halides of the aromatic aminocarboxylic acid, also may be used as monomers for forming the liquid crystal polymer.

Examples of the monomer for forming the aliphatic dioxy unit include aliphatic diols, such as ethylene glycol, 1,4-butanediol, and 1,6-hexanediol, and acylation products thereof.

The liquid crystal polymer including the aliphatic dioxy unit may also be obtained by reacting an aliphatic dioxy unit-containing polymer, such as polyethylene terephthalate or polybutylene terephthalate, with the aromatic oxycarboxylic acid, the aromatic dicarboxylic acid, the aromatic diol, or an acylation product, ester derivative, or acid halide thereof.

The liquid crystal polymer may also contain a thioester bond. Examples of a monomer capable of forming such a bond include mercapto aromatic carboxylic acids, aromatic dithiols, and hydroxy aromatic thiols.

Such monomers may be used in an amount of 10% by mole or less based on the total amount of the monomers capable of forming the aromatic oxycarbonyl repeating unit, the aromatic dicarbonyl repeating unit, the aromatic dioxy repeating unit, the aromatic aminooxy repeating unit, the aromatic diamino repeating unit, the aromatic aminocarbonyl repeating unit, the aromatic oxydicarbonyl repeating unit, and the aliphatic dioxy repeating unit.

As mentioned above, the monomer mixture containing a phenolic hydroxyl group-containing monomer may be acylated to produce a monomer mixture containing an acylation product of the phenolic hydroxyl group-containing monomer. The acylation may be performed by reacting the phenolic hydroxyl group with a fatty acid anhydride. The fatty acid anhydride may be, for example, acetic anhydride or propionic anhydride. In terms of price and handleability, acetic anhydride may be used.

The fatty acid anhydride may be used in an amount of 1.0 equivalent or more and 1.15 equivalents or less, or 1.03 equivalents or more and 1.10 equivalents or less, based on the amount of the phenolic hydroxyl group.

The monomer mixture containing a phenolic hydroxyl group-containing monomer and the fatty acid anhydride may be mixed and heated to undergo acylation to form a monomer mixture containing an acylation product of the phenolic hydroxyl group-containing monomer.

The resulting monomer mixture containing an acylation product of the phenolic hydroxyl group-containing monomer may be heated to undergo polycondensation, and fatty acids as by-products of the polycondensation may be removed by distillation, so that the liquid crystal polymer is obtained. The liquid crystal polymer may be produced only through melt polycondensation. In such a case, the melt polycondensation may be carried out at a temperature of 150° C. or more and 400° C. or less or at a temperature of 250° C. or more and 370° C. or less. The liquid crystal polymer may be produced through two stages including melt polycondensation and the solid phase polymerization described later. In such a case, the melt polycondensation may be carried out at a temperature of 120° C. or more and 350° C. or less or a temperature of 200° C. or more and 300° C. or less. The polycondensation reaction may be carried out for any time period as long as the resulting liquid crystal polymer has a desired melting point or a desired molecular weight. For example, the polycondensation reaction may be carried out for a time period of 30 minutes or more and 5 hours or less.

If necessary, the liquid crystal polymer produced by the method described above may be further subjected to polycondensation in which it is heated in a solidified state (solid phase) to form a higher molecular weight polymer.

Available examples of the first liquid crystal polymer (a-1) and the second liquid crystal polymer (a-2) include copolymers (1) to (26) shown below. Copolymers (1) to (26) can each have different melting points depending on the proportion of each monomer component or the polymerization process. Some of copolymers (1) to (26) may each correspond to both of the first liquid crystal polymer (a-1) and the second liquid crystal polymer (a-2) depending on the proportion of each monomer component or the polymerization process. The melting points of copolymers (1) to (26) are disclosed in many documents. By reference to known documents, therefore, those skilled in the art can determine what proportion to select for each monomer and what process to use for polymerization in order to produce liquid crystal polymers with desired melting points.

(1) 4-hydroxybenzoic acid-2-hydroxy-6-naphthoic acid copolymer;

(2) 4-hydroxybenzoic acid-terephthalic acid-4,4'-dihydroxybiphenyl copolymer;

(3) 4-hydroxybenzoic acid-terephthalic acid-isophthalic acid-4,4'-dihydroxybiphenyl copolymer;

(4) 4-hydroxybenzoic acid-terephthalic acid-isophthalic acid-4,4'-dihydroxybiphenyl-hydroquinone copolymer;

(5) 4-hydroxybenzoic acid-terephthalic acid-hydroquinone copolymer;

(6) 4-hydroxybenzoic acid-terephthalic acid-4,4'-dihydroxybiphenyl-hydroquinone copolymer;

(7) 2-hydroxy-6-naphthoic acid-terephthalic acid-hydroquinone copolymer;

(8) 4-hydroxybenzoic acid-2-hydroxy-6-naphthoic acid-terephthalic acid-4,4'-dihydroxybiphenyl copolymer;

(9) 2-hydroxy-6-naphthoic acid-terephthalic acid-4,4'-dihydroxybiphenyl copolymer;

(10) 4-hydroxybenzoic acid-2-hydroxy-6-naphthoic acid-terephthalic acid-hydroquinone copolymer;

(11) 4-hydroxybenzoic acid-2-hydroxy-6-naphthoic acid-terephthalic acid-hydroquinone-4,4'-dihydroxybiphenyl copolymer;

(12) 4-hydroxybenzoic acid-2,6-naphthalenedicarboxylic acid-4,4'-dihydroxybiphenyl copolymer;

(13) 4-hydroxybenzoic acid-terephthalic acid-2,6-naphthalenedicarboxylic acid-hydroquinone copolymer;

(14) 4-hydroxybenzoic acid-2,6-naphthalenedicarboxylic acid-hydroquinone copolymer;

(15) 4-hydroxybenzoic acid-2-hydroxy-6-naphthoic acid-2,6-naphthalenedicarboxylic acid-hydroquinone copolymer;

(16) 4-hydroxybenzoic acid-terephthalic acid-2,6-naphthalenedicarboxylic acid-hydroquinone-4,4'-dihydroxybiphenyl copolymer;

(17) 4-hydroxybenzoic acid-terephthalic acid-4-aminophenol copolymer;

(18) 2-hydroxy-6-naphthoic acid-terephthalic acid-4-aminophenol copolymer;

(19) 4-hydroxybenzoic acid-2-hydroxy-6-naphthoic acid-terephthalic acid-4-aminophenol copolymer;

(20) 4-hydroxybenzoic acid-terephthalic acid-4,4'-dihydroxybiphenyl-4-aminophenol copolymer;

(21) 4-hydroxybenzoic acid-terephthalic acid-ethylene glycol copolymer;

(22) 4-hydroxybenzoic acid-terephthalic acid-4,4'-dihydroxybiphenyl-ethylene glycol copolymer;

(23) 4-hydroxybenzoic acid-2-hydroxy-6-naphthoic acid-terephthalic acid-ethylene glycol copolymer;

(24) 4-hydroxybenzoic acid-2-hydroxy-6-naphthoic acid-terephthalic acid-4,4'-dihydroxybiphenyl-ethylene glycol copolymer;

(25) 4-hydroxybenzoic acid-terephthalic acid-2,6-naphthalenedicarboxylic acid-4,4'-dihydroxybiphenyl copolymer; and

(26) 2-hydroxy-6-naphthoic acid-2,6-naphthalenedicarboxylic acid-4,4'-dihydroxybiphenyl-hydroquinone copolymer.

In the thermoplastic resin composition, the liquid crystal polymers (A) may be any type as long as they include a combination of the first liquid crystal polymer (a-1) and the second liquid crystal polymer (a-2). The liquid crystal polymers (A) may have any appropriate chemical structures and melting points that satisfy the requirements specified above and do not interfere with one or more embodiments of the present invention. For heat resistance, the liquid crystal polymer (a-1) may have a melting point of 250° C. or more, 270° C. or more, or in the range of 270° C. or more and 290° C. or less. For processability and for prevention of the decomposition of the modified polyolefin (B) during the production of the thermoplastic resin composition, the second liquid crystal polymer (a-2) may have a melting point of 400° C. or less, 350° C. or less, for example, or in the range of 310° C. or more and 350° C. or less.

The melting points of the liquid crystal polymers (A) are, for example, the temperatures determined from crystal melting peaks measured at a rate of temperature increase of 20° C./min using a differential scanning calorimeter (hereinafter abbreviated as DSC). More specifically, samples of the liquid crystal polymers are each subjected to a measurement process that includes measuring an endothermic peak temperature (Tm1) while heating the sample at a rate of temperature increase of 20° C./minute from room temperature; then holding the sample for 10 minutes at a temperature higher than Tm1 by 20° C. or more and 50° C. or less; then cooling the sample at a rate of temperature decrease of 20° C./minute to room temperature; and then measuring an endothermic peak while heating the sample again at a rate of temperature increase of 20° C./minute, in which the melting point of the liquid crystal polymer is defined as the peak top temperature. The measurement device may be, for example, DSC Q1000 manufactured by TA Instruments.

For heat resistance, the first liquid crystal polymer (a-1) and the second liquid crystal polymer (a-2) both may be wholly aromatic liquid crystal polymers. For higher compatibility, the first liquid crystal polymer (a-1) and the second liquid crystal polymer (a-2) may share the same monomer component. As described above, even when the liquid crystal polymers are produced from the same combination of monomers, their melting points can be adjusted to different levels by changing the composition of the monomer mixture. For example, therefore, two liquid crystal polymers having the same monomer component combination as that of copolymer (26) shown above and being different only in monomer composition may be used as the first and second liquid crystal polymers (a-1) and (a-2). In this case, the two polymers have very close chemical structures and are more compatible with each other, so that they can form a thermoplastic resin composition with better physical properties. Two or more first liquid crystal polymers (a-1) and/or two or more second liquid crystal polymers (a-2) may be used so that their compatibility can be adjusted.

In the thermoplastic resin composition, the mass ratio (A)/(B) of the liquid crystal polymers (A) and the modified polyolefin (B) may be 95/5 to 55/45. Moreover, at least the sea phase or the continuous phase may include the second liquid crystal polymer (a-2). For such a feature, the content of the second liquid crystal polymer (a-2) in the thermoplastic resin composition may be 30% by mass or more and 85% by mass or less, or 40% by mass or more and 80% by mass or less, based on the total mass of the thermoplastic resin composition, which may be normalized to 100% by mass. In this case, the thermoplastic resin composition tends to have higher heat resistance. The thermoplastic resin composition may contain the first liquid crystal polymer (a-1) at any suitable concentration. While varying with the mass ratio of the liquid crystal polymers (A) to the modified polyolefin (B) or with the chemical structure of each component, in general, the content of the first liquid crystal polymer (a-1) in the thermoplastic resin composition may be 5% by mass or more and 50% by mass or less, or 15% by mass or more and 40% by mass or less, based on the mass of the thermoplastic resin composition, which may be normalized to 100% by mass. The first liquid crystal polymer (a-1) and the second liquid crystal polymer (a-2) may be in a mass ratio (a-1)/(a-2) of 3/2 to 1/10, or 1/1 to 1/5. With such a component ratio, the thermoplastic resin composition tends to have particularly high heat resistance and low dielectric properties.

Modified Polyolefin (B)

The modified polyolefin (B) may be any resin that is a product of modification of a polyolefin and has a polar group. Two or more modified polyolefins may also be used in combination.

As used herein, the term "polar group" refers to a polar atomic group. Organic compounds with such a group have polar properties. Examples of the polar group that can be introduced into polyolefins include carboxy groups derived from unsaturated carboxylic acids, such as acrylic acid, methacrylic acid, maleic acid, fumaric acid, tetrahydrophthalic acid, itaconic acid, citraconic acid, crotonic acid, and isocrotonic acid; acid anhydride groups, halocarbonyl groups, carboxylic acid amide groups, imide groups, and carboxylic acid ester groups derived from derivatives of the unsaturated carboxylic acids, such as acid anhydrides, acid halides, amides, imides, and esters; and epoxy groups derived from epoxy group-containing vinyl monomers, such as glycidyl methacrylate, glycidyl acrylate, monoglycidyl maleate, diglycidyl maleate, monoglycidyl itaconate, diglycidyl itaconate, allyl monoglycidyl succinate, allyl diglycidyl succinate, glycidyl p-styrenecarboxylate, allyl glycidyl ether, methacryl glycidyl ether, styrene-p-glycidyl ether, p-glycidylstyrene, 3,4-epoxy-1-butene, 3,4-epoxy-3-methyl-1-buten, and vinylcyclohexene monooxide. Among these polar groups, the modified polyolefin (B) may contain an epoxy group so that it can easily form a thermoplastic resin composition in a preferred phase state and produce good adhesion between the thermoplastic resin composition and any other material used in contact with the thermoplastic resin composition.

The epoxy group can react with a phenolic hydroxyl group, a carboxyl group, or other functional groups in the liquid crystal polymers (A). Thus, the modified polyolefin (B) having an epoxy group(s) as the polar group and the liquid crystal polymers (A), especially the first liquid crystal polymer (a-1), have a suitable affinity for each other in the thermoplastic resin composition and can easily form a preferred phase structure, such as a sea-island structure.

The modified polyolefin (B) may be a graft-modified polyolefin having a polar group. The graft-modified polyolefin is typically a resin obtained by graft-modifying a polyolefin with a polar group-containing vinyl monomer in the presence of a radical polymerization initiator.

Specifically, the modified polyolefin (B) may be a polyolefin graft-modified with a polar group-containing vinyl monomer and an aromatic vinyl monomer. In particular, the modified polyolefin (B) may be a polyolefin graft-modified with glycidyl (meth)acrylate and styrene.

Examples of the polyolefin include linear polyolefins, such as polyethylene, polypropylene, poly-1-butene, polyisobutylene, polymethylpentene, propylene-ethylene copolymers, ethylene-propylene-diene copolymers, ethylene-butene-1 copolymers, and ethylene-octene copolymers; and cyclic polyolefins, such as copolymers of cyclopentadiene and ethylene and/or propylene.

Among these polyolefins, polymethylpentene, polyethylene, polypropylene, and propylene-ethylene copolymers are preferred because they easily undergo the modification reaction, and polymethylpentene is more preferred for heat resistance and low dielectric properties.

Examples of the radical polymerization initiator, which may be used for modification, specifically, graft modification of the polyolefin, include ketone peroxides, such as methyl ethyl ketone peroxide and methyl acetoacetate peroxide; peroxyketals, such as 1,1-bis(tert-butylperoxy)-3,3,5-trimethylcyclohexane, 1,1-bis(tert-butylperoxy)cyclohexane, n-butyl-4,4-bis(tert-butylperoxy)valerate, and 2,2-bis(tert-butylperoxy)butane; hydroperoxides, such as permethane hydroperoxide, 1,1,3,3-tetramethylbutyl hydroperoxide, diisopropylbenzene hydroperoxide, and cumene hydroperoxide; dialkyl peroxides, such as dicumyl peroxide, 2,5-dimethyl-2,5-di(tert-butylperoxy)hexane, α,α'-bis(tert-butylperoxy-m-isopropyl)benzene, tert-butyl-cumyl peroxide, di-tert-butyl peroxide, and 2,5-dimethyl-2, 5-di(tert-butylperoxy)hexyne-3; diacyl peroxides, such as benzoyl peroxide; peroxydicarbonates, such as di(3-methyl-3-methoxybutyl)peroxydicarbonate and di-2-methoxybutyl peroxydicarbonate; and peroxyesters, such as tert-butyl peroxyoctate, tert-butyl peroxyisobutylate, tert-butyl peroxylaurate, tert-butyl peroxy-3,5,5-trimethylhexanoate, tert-butyl peroxyisopropylcarbonate, 2,5-dimethyl-2,5-di(benzoylperoxy)hexane, tert-butyl peroxyacetate, tert-butyl peroxybenzoate, and di-tert-butyl peroxyisophthalate. These radical polymerization initiators may be used alone, or a mixture of two or more of these polymerization initiators may be used.

The radical polymerization initiator may be used in any amount effective to allow the modification reaction to proceed successfully. The radical polymerization initiator used may be in an amount of 0.01 parts by mass or more and 10 parts by mass or less, or 0.2 parts by mass or more and 5 parts by mass or less, based on 100 parts by mass of the polyolefin.

Examples of the polar group-containing vinyl monomer, which may be used for the modification, include unsaturated carboxylic acids, such as acrylic acid, methacrylic acid, maleic acid, fumaric acid, tetrahydrophthalic acid, itaconic acid, citraconic acid, crotonic acid, and isocrotonic acid; derivatives of the unsaturated carboxylic acids, such as acid anhydrides (e.g., maleic anhydride), acid halides, amides, imides, and esters; and epoxy group-containing viny monomers, such as glycidyl methacrylate, glycidyl acrylate, monoglycidyl maleate, diglycidyl maleate, monoglycidyl itaconate, diglycidyl itaconate, monoglycidyl allylsuccinate, diglycidyl allylsuccinate, glycidyl p-styrenecarboxylate, allyl glycidyl ether, methacryl glycidyl ether, styrene-p-glycidyl ether, p-glycidyl styrene, 3,4-epoxy-1-butene, 3,4-epoxy-3-methyl-1-butene, and vinylcyclohexene monoxide.

Among these monomers, epoxy group-containing vinyl monomers are preferred, glycidyl methacrylate and glycidyl acrylate are more preferred, and glycidyl methacrylate is even more preferred.

The polar group-containing vinyl monomers may be used alone, or a mixture of two or more of the polar group-containing vinyl monomers may be used. Any of the vinyl monomers may be grafted to the polyolefin or copolymerized with the olefin to form the polar group-containing modified polyolefin (B). The copolymerization may be performed by any appropriate method, and the modified polyolefin (B) may be a block copolymer, a random copolymer, an alternating copolymer, a graft copolymer, or any other copolymer. For effective compatibilization with the liquid crystal polymers (A), the modified polyolefin (B) may be a block copolymer or a graft copolymer, or a graft copolymer. In particular, the modified polyolefin (B) may be a graft-modified polyolefin including: a polyolefin skeleton, specifically, a polyolefin molecular chain having a single monomer unit; and a polar group-containing monomer, oligomer, or polymer grafted to the polyolefin molecular chain.

When used for the modification of the polyolefin, specifically, the graft modification of the polyolefin, the polar group-containing vinyl monomer may be added in an amount of 0.1 parts by mass or more and 12 parts by mass or less, 0.2 parts by mass or more and 8 parts by mass or less, or 0.5 parts by mass or more and 3 parts by mass or less, based on 100 parts by mass of the polyolefin.

When produced using the polyolefin modified with the polar group-containing vinyl monomer in an amount within such a range, the thermoplastic resin composition tends to be in a preferred phase state and to have desired low dielectric properties.

As mentioned above, the modified polyolefin (B) may be a polyolefin graft-modified with a polar group-containing vinyl monomer and an aromatic vinyl monomer.

This is because the use of a combination of a polar group-containing vinyl monomer and an aromatic vinyl monomer can stabilize the grafting reaction so that the polar group-containing vinyl monomer can be easily grafted in a desired amount.

Examples of the aromatic vinyl monomer include styrene; alkyl styrenes, such as o-methylstyrene, m-methylstyrene, p-methylstyrene, α-methylstyrene, β-methylstyrene, dimethylstyrene, and trimethylstyrene; chlorostyrenes, such as o-chlorostyrene, m-chlorostyrene, p-chlorostyrene, α-chlorostyrene, β-chlorostyrene, dichlorostyrene, and trichlorostyrene; bromostyrenes, such as o-bromostyrene, m-bromostyrene, p-bromostyrene, dibromostyrene, and tribromostyrene; fluorostyrenes, such as o-fluorostyrene, m-fluorostyrene, p-fluorostyrene, difluorostyrene, and trifluorostyrene; nitrostyrenes, such as o-nitrostyrene, m-nitrostyrene, p-nitrostyrene, dinitrostyrene, and trinitrostyrene; hydroxystyrenes, such as o-hydroxystyrene, m-hydroxystyrene, p-hydroxystyrene, dihydroxystyrene, and trihydroxystyrene; and dialkenyl benzenes, such as o-divinyl benzene, m-divinyl benzene, p-divinyl benzene, o-diisopropenyl benzene, m-diisopropenyl benzene, and p-diisopropenyl benzene.

Among these aromatic vinyl monomers, styrene, α-methylstyrene, p-methylstyrene, o-divinyl benzene, m-divinyl benzene, p-divinyl benzene, or a divinyl benzene isomer mixture is preferred for low cost, and styrene is particularly preferred.

One of or a mixture of two or more of the aromatic vinyl monomers may be used.

For the graft modification of the polyolefin, the polar group-containing aromatic vinyl monomer may be used in an amount of 0.1 parts by mass or more and 12 parts by mass or less, 0.2 parts by mass or more and 8 parts by mass or less, or 0.5 parts by mass or more and 3 parts by mass or less, based on 100 parts by mass of the polyolefin.

The thermoplastic resin composition described above may be processed into a variety of molded articles by a variety of known processes, such as injection molding, extrusion molding, and blow molding.

The thermoplastic resin composition, which has excellent low dielectric properties in high frequency ranges, may be processed into a film, which may be used to form a flexible printed wiring board with low transmission loss.

EXAMPLES

Hereinafter, one or more embodiments of the present invention will be described in more detail with reference to examples, which are not intended to limit one or more embodiments of the present invention.

Production Example 1

Production of Modified Polyolefin B-1

Through a hopper inlet, 100 parts by mass of (a1) polymethylpentene resin (TPX-grade MX002 manufactured by Mitsui Chemicals, Inc.) and 0.5 parts by mass of (b1) 1,3-di(tert-butyl peroxyisopropyl)benzene (Perbutyl P manufactured by NOF Corporation) were supplied to a twin screw extruder (46 mmφ, L/D=63, manufactured by Kobe Steel, Ltd.) with a cylinder temperature set at 230° C. and a screw rotation speed set at 150 rpm, and melted and kneaded. During the melting and kneading, 2 parts by mass of (c1) styrene and 2 parts by mass of (d1) glycidyl methacrylate were added to the extruder from a middle portion of the cylinder. The extruder was then evacuated under vacuum from its vent port, so that modified polyolefin resin pellets were obtained.

The resulting resin pellets were dissolved in xylene at 130° C. and then cooled to room temperature again. The resulting precipitated recrystallized resin was subjected to the measurement of the degree of modification with glycidyl methacrylate using a potentiometric automatic titrator (AT700 manufactured by Kyoto Electronics Manufacturing Co., Ltd.) according to JIS K 7236. The resulting modified polyolefin 1 had a degree of modification with glycidyl methacrylate of 0.74% by mass.

Production Examples 2 and 3

Production of Modified Polyolefins B-2 and B-3

Modified polyolefins B-2 and B-3 were produced by the same procedure as that in Production Example 1 except that the amounts of (b1) 1,3-di(tert-butyl peroxyisopropyl)benzene (Perbutyl P manufactured by NOF Corporation), (c1) styrene, and (d1) glycidyl methacrylate were changed as shown below. Each of the modified polyolefins had the degree of modification with glycidyl methacrylate shown below.

Modified polyolefin 2: (b1) 1.0 part by mass, (c1) 4 parts by mass, (d1) 4 parts by mass; degree of modification with glycidyl methacrylate 1.77% by mass Modified polyolefin 3: (b1) 1.0 part by mass, (c1) 6 parts by mass, (d1) 6 parts by mass; degree of modification with glycidyl methacrylate 1.94% by mass

Examples 1 to 15 and Comparative Examples 1 to 9

In the examples and the comparative examples, a wholly aromatic liquid crystal polyester resin A-1 with a melting point of 280° C. and a wholly aromatic liquid crystal polyester resin A-2 with a melting point of 320° C. were used as the first liquid crystal polymer (a-1) and the second liquid crystal polymer (a-2), respectively, and one of modified polyolefins B-1, B-2, and B-3 obtained in Production Examples 1, 2, and 3 was used as the modified polyolefin (B).

The materials in the amounts shown in Tables 1 to 3 were supplied through a hopper inlet to a twin screw extruder (25 mmφ, L/D=40, manufactured by Technovel Corporation) with a cylinder temperature set at 340° C. and a screw rotation speed set at 150 rpm, and melted and kneaded to form a resin composition according to each of the examples and the comparative examples. In Comparative Example 1, the liquid crystal polymer A-2 alone was evaluated. The extruded product (strand) made of the resin composition or the resin of each of the examples and the comparative examples was observed for appearance and evaluated as being "poorly molded" (represented by "bad") when foaming or gelling was observed, and evaluated as being "successfully molded" (represented by "good") when such a defect was not found. The extruded product was also evaluated for relative permittivity, dielectric dissipation factor, and heat resistance by the methods shown below. Tables 1 to 3 show the results of the evaluations.

Relative Permittivity and Dielectric Dissipation Factor

The permittivity and dielectric dissipation factor of each resin or resin composition were measured at the frequency shown below using a cavity resonator perturbation complex permittivity analyzer.

Measurement frequency: 10 GHz

Measurement conditions: temperature 22° C. to 24° C., humidity 45% to 55%

Measurement sample: sample having been allowed to stand for 24 hours under the above measurement conditions Heat Resistance The temperature (° C.) at which the storage elastic modulus of the sample reached $10^7$ MPa or less was measured using a dynamic viscoelastometer. The sample was evaluated as having "high heat resistance" (represented by "good") when the measured temperature was 300° C. or more, and evaluated as having "low heat resistance" (represented by "bad") when the measured temperature was less than 300° C.

Sample measurement range: 5 mm wide, 20 mm distance between grippers

Measurement temperature range: 25° C. to 310° C.

Rate of temperature increase: 5° C./minute

Strain amplitude: 0.1%

Measurement frequency: 1 Hz

Minimum tension/compression force: 0.1 g

Force amplitude initial value: 100 g

Phase Structure

Figure 2:
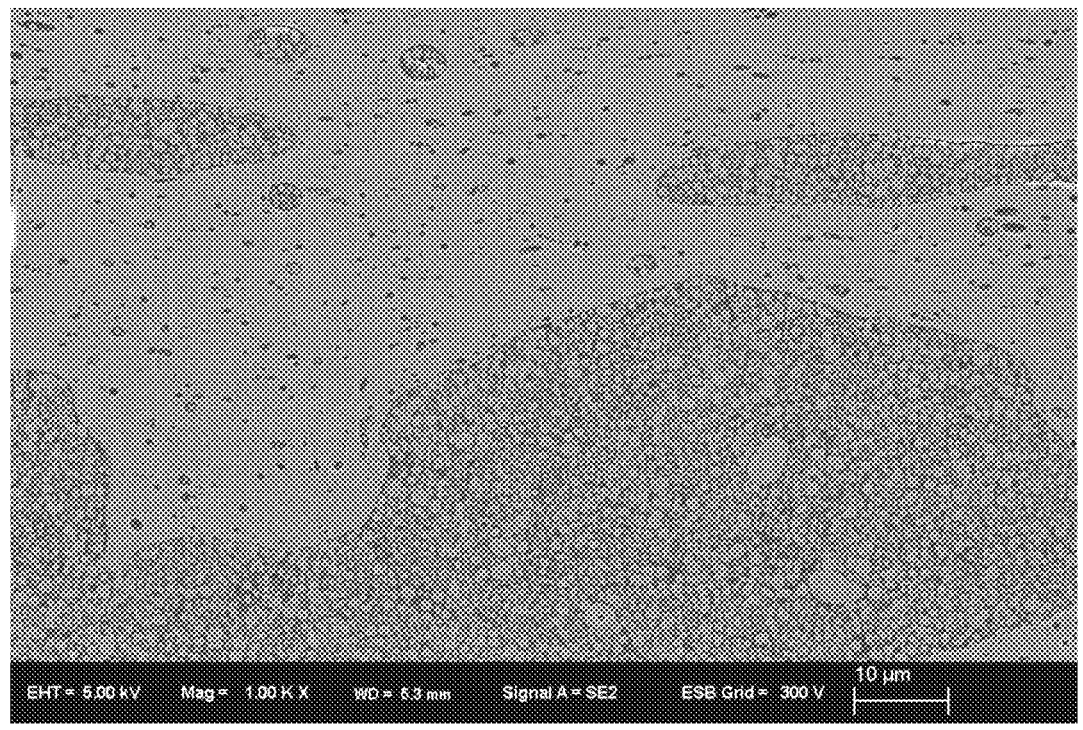
FIG. 2 is a scanning electron micrograph (at a magnification of 1,000 times) of a surface of an extruded product obtained from a thermoplastic resin composition according to one or more embodiments of the present invention in Example 15.

The phase structure of some of the compositions was observed with a microscope. The results of the observation were classified according to the criteria shown below. Tables 1 to 3 show the results of the observation. FIGS. 1 and 2 (Examples 11 and 15) are examples of the micrographs.

A: Sea-island structure (in which (A) component forms the sea phase)

B: Sea-island structure (in which (A) component forms the island phase)

C: Co-continuous structure (with the island phase in part of the continuous region)

D: Phase separation

TABLE 1

| | | Example | | | | | | | | |
| --- | --- | --- | --- | --- | --- | --- | --- | --- | --- | --- |
| | | Comparative Example 1 | Example 1 | Example 2 | Example 3 | Example 4 | Example 5 | Example 6 | Example 7 | Comparative Example 2 |
| Composition* | First liquid crystal polymer[1] | — | 5 | 15 | 25 | 35 | 40 | 45 | 50 | — |
| | Second liquid crystal polymer[2] | 100 | 80 | 70 | 60 | 50 | 45 | 40 | 35 | 85 |
| | Modified polyolefin[3] | — | (B-1) 15 | (B-1) 15 | (B-1) 15 | (B-1) 15 | (B-1) 15 | (B-1) 15 | (B-1) 15 | (B-1) 15 |
| Appearance and physical properties | Moldability | good | good | good | good | good | good | good | good | bad |
| | Heat resistance | good | good | good | good | good | good | good | good | ※ |
| | Relative permittivity (10 GHz) | 2.9 | 2.8 | 2.7 | 2.6 | 2.6 | 2.6 | 2.9 | 2.9 | ※ |

TABLE 1-continued

| | | Comparative Example 1 | Example 1 | Example 2 | Example 3 | Example 4 | Example 5 | Example 6 | Example 7 | Comparative Example 2 |
|---|---|---|---|---|---|---|---|---|---|---|
| | | | | | | Example | | | | |
| Dielectric loss (10 GHz) | | 0.0013 | 0.0015 | 0.0013 | 0.0013 | 0.0014 | 0.0013 | 0.0011 | 0.0012 | ※ |
| Phase structure | | | A | A | A | A | A | A | A | ※ |

*Units: Parts by mass
[1] Wholly aromatic liquid crystal polyester resin A-1 with melting point 280° C.
[2] Wholly aromatic liquid crystal polyester resin A-2 with melting point 320° C.
[3] Modified polyolefin (based on polymethylpentene)
※ Impossible to measure due to molding failure

TABLE 2

| | | Comparative Example 3 | Comparative Example 4 | Comparative Example 5 | Comparative Example 6 | Comparative Example 7 | Example 8 | Comparative Example 8 | Comparative Example 9 | Comparative Example 10 |
|---|---|---|---|---|---|---|---|---|---|---|
| | | | | | | Example | | | | |
| Composition* | First liquid crystal polymer[1] | — | — | — | — | — | 15 | — | 75 | 80 |
| | Second liquid crystal polymer[2] | 95 | 90 | 80 | 75 | 50 | 70 | 75 | — | — |
| | Modified polyolefin[3] | (B-1) 5 | (B-1) 10 | (B-1) 20 | (B-1) 25 | (B-1) 50 | (B-2) 15 | (B-2) 25 | (B-2) 25 | (B-2) 20 |
| Appearance and physical properties | Moldability | bad | bad | bad | bad | bad | good | bad | good | good |
| | Heat resistance | ※ | ※ | ※ | ※ | ※ | good | ※ | bad | bad |
| | Relative Permittivity (10 GHz) | ※ | ※ | ※ | ※ | ※ | 2.7 | ※ | 2.4 | 2.5 |
| | Dielectric loss (10 GHz) | ※ | ※ | ※ | ※ | ※ | 0.0014 | ※ | 0.0022 | 0.0021 |
| | Phase structure | ※ | ※ | ※ | ※ | ※ | A | ※ | C | A |

*Units: Parts by mass
[1] Wholly aromatic liquid crystal polyester resin A-1 with melting point 280° C.
[2] Wholly aromatic liquid crystal polyester resin A-2 with melting point 320° C.
[3] Modified polyolefin (based on polymethylpentene)
※ Impossible to measure due to molding failure

45

TABLE 3

| | | Example 9 | Example 10 | Example 11 | Comparative Example 11 | Example 12 | Example 13 | Example 14 | Example 15 |
|---|---|---|---|---|---|---|---|---|---|
| | | | | | Example | | | | |
| Composition* | First liquid crystal polymer[1] | 5 | 15 | 20 | — | 7.5 | 45 | 50 | 40 |
| | Second liquid crystal polymer[2] | 80 | 70 | 60 | 75 | 70 | 35 | 30 | 40 |
| | Modified polyolefin[3] | (B-3) 15 | (B-3) 15 | (B-3) 20 | (B-3) 25 | (B-3) 22.5 | (B-3) 20 | (B-3) 20 | (B-3) 20 |
| Appearance and physical properties | Moldability | good | good | good | bad | good | good | good | good |
| | Heat resistance | good | good | good | ※ | good | good | good | good |
| | Relative permittivity (10 GHz) | 2.7 | 2.8 | 2.7 | ※ | 2.5 | 2.6 | 2.6 | 2.5 |

TABLE 3-continued

| | Example | | | | | | | |
| | Example 9 | Example 10 | Example 11 | Comparative Example 11 | Example 12 | Example 13 | Example 14 | Example 15 |
|---|---|---|---|---|---|---|---|---|
| Dielectric loss (10 GHz) | 0.0014 | 0.0015 | 0.0014 | X | 0.0014 | 0.0015 | 0.0015 | 0.0023 |
| Phase structure | A | A | A | X | A | A | A | C |

*Units: Parts by mass
[1])Wholly aromatic liquid crystal polyester resin A-1 with melting point 280° C.
[2])Wholly aromatic liquid crystal polyester resin A-2 with melting point 320° C.
[3])Modified polyolefin (based on polymethylpentene)
X: Impossible to measure due to molding failure The examples show that the thermoplastic resin including the first liquid crystal polymer (a-1) with a melting point of less than 300° C., the second liquid crystal polymer (a-2) with a melting point of at least 300° C., and the modified polyolefin (B) having a polar group has high heat resistance, satisfactorily low dielectric properties, and high molding processability. In particular, the thermoplastic resin compositions of Examples 2 to 5, which have a first liquid crystal polymer content of 15% by mass or more and 40% by mass or less, have a good balance between the three properties: high heat resistance, satisfactorily low dielectric properties, and high molding processability. FIG. 1 is a scanning electron micrograph (at a magnification of 1,000 times) of a surface of the extruded product obtained in Example 11. The electron micrograph shows that the resin components are uniformly dispersed and form a sea-island structure with a salami-like structure.

On the other hand, the thermoplastic resin compositions of Comparative Examples 2 to 8 and 11, which contained no first liquid crystal polymer (a-1) with a melting point of less than 300° C., underwent foaming or gelation during the molding and failed to form any molded product available for the physical property test, even with control of the modification degree of the modified polyolefin (B) or control of the component proportion. The results of the comparative examples suggest that the melting and kneading process may significantly degrade the modified polyolefin (B) in the mixture containing the second liquid crystal polymer (a-2) having a melting point of at least 300° C. without containing first liquid crystal polymer (a-1) having a melting point of less than 300° C. In Comparative Examples 9 and 10, extruded products were obtained with no appearance defect, but they had insufficient heat resistance. In contrast, the thermoplastic resin compositions of Examples 1 to 7 and 12, which contained the modified polyolefin (B) in almost the same amount as that in the comparative examples, had the property of being molded into a high-quality strand and satisfactorily low dielectric properties. Even though having a liquid crystal polymer (A-2) content of 30 to 40% by mass, the thermoplastic resin compositions of Examples 6, 7, and 13 to 15 have high heat resistance. This may be because the second liquid crystal polymer (a-2) with a melting point of at least 300° C. is in the sea or continuous phase. FIG. 2 is a scanning electron micrograph (at a magnification of 1,000 times) of a surface of the extruded product obtained in Example 15. The electron micrograph shows a co-continuous structure containing an island phase in part.

Although the disclosure has been described with respect to only a limited number of embodiments, those skilled in the art, having benefit of this disclosure, will appreciate that various other embodiments may be devised without depart-ing from the scope of the present disclosure. Accordingly, the scope of the invention should be limited only by the attached claims.

What is claimed is:

1. A thermoplastic resin composition comprising:
liquid crystal polymers (A); and
a modified polyolefin (B) having a polar group,
wherein the liquid crystal polymers (A) include a first liquid crystal polymer (a-1) having a melting point of less than 300° C. and a second liquid crystal polymer (a-2) having a melting point of 300° C. or more, and
wherein the first liquid crystal polymer (a-1) and the second liquid crystal polymer (a-2) are both wholly aromatic liquid crystal polymers.

2. The thermoplastic resin composition according to claim 1, having a phase structure of a sea-island structure or a co-continuous structure, wherein:
the sea-island structure contains a sea phase forming a continuous region and an island phase forming a discontinuous region dispersed in the sea phase,
the co-continuous structure contains two or more components forming two or more continuous phases, the two or more continuous phases being mixed with each other, and
the second liquid crystal polymer (a-2) is contained in at least one phase of the sea phase and the two or more continuous phases.

3. The thermoplastic resin composition according to claim 2, wherein the polar group is an epoxy group.

4. The thermoplastic resin composition according to claim 2, wherein the modified polyolefin (B) is a modified polymethylpentene.

5. The thermoplastic resin composition according to claim 2, wherein the modified polyolefin (B) is a graft-modified polyolefin.

6. The thermoplastic resin composition according to claim 2, wherein a mass ratio (A)/(B) of the liquid crystal polymers (A) and the modified polyolefin (B) is 95/5 to 77/23.

7. The thermoplastic resin composition according to claim 2, wherein a content of the first liquid crystal polymer (a-1) is 15% by mass or more and 40% by mass or less, and a content of the second liquid crystal polymer (a-2) is 45% by mass or more and 80% by mass or less, based on the total mass of the thermoplastic resin composition.

8. The thermoplastic resin composition according to claim 1, wherein the polar group is an epoxy group.

9. The thermoplastic resin composition according to claim 8, wherein the modified polyolefin (B) is a modified polymethylpentene.

10. The thermoplastic resin composition according to claim 9, wherein a mass ratio (A)/(B) of the liquid crystal polymers (A) and the modified polyolefin (B) is 95/5 to 77/23.

11. The thermoplastic resin composition according to claim 9, wherein a content of the first liquid crystal polymer (a-1) is 15% by mass or more and 40% by mass or less, and a content of the second liquid crystal polymer (a-2) is 45% by mass or more and 80% by mass or less, based on the total mass of the thermoplastic resin composition.

12. The thermoplastic resin composition according to claim 8, wherein the modified polyolefin (B) is a graft-modified polyolefin.

13. Thermoplastic resin composition according to claim 8, wherein a mass ratio (A)/(B) of the liquid crystal polymers (A) and the modified polyolefin (B) is 95/5 to 77/23.

14. The thermoplastic resin composition according to claim 1, wherein the modified polyolefin (B) has a melting point of 200° C. or more.

15. The thermoplastic resin composition according to claim 14, wherein a mass ratio (A)/(B) of the liquid crystal polymers (A) and the modified polyolefin (B) is 95/5 to 77/23.

16. The thermoplastic resin composition according to claim 1, wherein the modified polyolefin (B) is a modified polymethylpentene.

17. The thermoplastic resin composition according to claim 1, wherein the modified polyolefin (B) is a polyolefin graft-modified with a polar group-containing vinyl monomer and an aromatic vinyl monomer.

18. The thermoplastic resin composition according to claim 1, wherein a mass ratio (A)/(B) of the liquid crystal polymers (A) and the modified polyolefin (B) is 95/5 to 77/23.

19. A method for producing the thermoplastic resin composition according to claim 1, the method comprising, melting and kneading the first liquid crystal polymer (a-1), the second liquid crystal polymer (a-2), and the modified polyolefin (B) having a polar group.

20. The thermoplastic resin composition according to claim 1, wherein a content of the first liquid crystal polymer (a-1) is 15% by mass or more and 40% by mass or less, and a content of the second liquid crystal polymer (a-2) is 45% by mass or more and 80% by mass or less, based on the total mass of the thermoplastic resin composition.

* * * * *